(12) United States Patent
Mack et al.

(10) Patent No.: US 8,194,125 B2
(45) Date of Patent: Jun. 5, 2012

(54) LARGE-ANGLE UNIFORM RADIANCE SOURCE

(75) Inventors: John A. Mack, El Segundo, CA (US);
Marion N. Todd, Gainesville, GA (US);
David F. Rock, Torrance, CA (US)

(73) Assignee: Raytheon Company, Waltham, MA (US)

( * ) Notice: Subject to any disclaimer, the term of this patent is extended or adjusted under 35 U.S.C. 154(b) by 1252 days.

(21) Appl. No.: 11/980,912

(22) Filed: Oct. 31, 2007

(65) Prior Publication Data

US 2009/0108213 A1     Apr. 30, 2009

(51) Int. Cl.
*H04N 9/47* (2006.01)
(52) U.S. Cl. ........ 348/131; 362/243; 362/244; 362/245; 362/246; 362/247
(58) Field of Classification Search .................. 348/131; 362/243–247
See application file for complete search history.

(56) References Cited

U.S. PATENT DOCUMENTS

| | | | |
|---|---|---|---|
| 4,417,300 A | 11/1983 | Bodmer | |
| 5,098,184 A | 3/1992 | van den Brandt et al. | |
| 5,251,004 A | 10/1993 | Doiron et al. | |
| 5,418,583 A | 5/1995 | Masumoto | |
| 5,607,229 A | 3/1997 | Rykowski et al. | |
| 5,755,503 A | 5/1998 | Chen et al. | |
| 6,422,718 B1 | 7/2002 | Anderson et al. | |
| 7,023,472 B1 | 4/2006 | Kang et al. | |
| 2003/0034985 A1 | 2/2003 | Needham Riddle et al. | |
| 2008/0204705 A1 | 8/2008 | Liu | |

FOREIGN PATENT DOCUMENTS

| | | |
|---|---|---|
| JP | 50 021586 U | 3/1975 |
| WO | 94/02835 A1 | 2/1994 |

OTHER PUBLICATIONS

Snail, K. A., et al., "Integrating Sphere Designs with Isotropic Throughput", Appl. Optics, OSA, Optical Society of America, Washington, DC, vol. 28, No. 10, pp. 1793-1799 (1989).
International Search Report and Written Opinion dated Mar. 15, 2010 of PCT/US2009/036920 filed Mar. 12, 2009 (18 pages).
Anon., "A Guide to Integrating Sphere Theory and Applications", Published by Labsphee, Inc., Nov. 1998, pp. 1-18.
PCT/US2009/036920 filed Dec. 3, 2009, Partial Intl. Search Report, mailed Dec. 28, 2009 (5 pages).
Intl. Preliminary Report on Patentability dated Jun. 24, 2011 of PCT/US2009/036920 filed Mar. 12, 2009 (15 pages).

*Primary Examiner* — Duyen Doan
(74) *Attorney, Agent, or Firm* — Lando & Anastasi, LLP

(57) ABSTRACT

A radiance source includes a housing having an interior wall, wherein at least a spherical portion of the interior wall of the housing is spherical, an interior volume, and an exit port. A light source is disposed within the interior volume of the housing. A calibration structure blocks and reflects a light ray that would otherwise travel directly from the light source to the exit port without reflecting from the interior wall. The calibration structure has a calibration body having a curved back surface facing the light source and a curved front surface facing the exit port. There is an optically diffuse, lambertian reflecting surface on at least the spherical portion of the interior wall of the housing, the back surface of the calibration body, and the front surface of the calibration body.

17 Claims, 2 Drawing Sheets

LARGE-ANGLE UNIFORM RADIANCE SOURCE

This invention was made with Government support under Contract No. Withheld. The Government has certain rights in this invention.

This invention relates to a radiance source and, more particularly, to a radiance source that provides a highly uniform light output over a large illumination angle.

BACKGROUND OF THE INVENTION

Many optical devices must be inspected and calibrated to determine their performance over the entire viewing area. For example, a focal plane array includes thousands of pixels. When illuminated, each pixel produces a respective electrical signal value related to the intensity of incident light. The electrical signal values of the individual pixels are supplied to a processor, which assembles the information into a viewable image or otherwise processes the pixel information.

Ideally, all of the pixels of the focal plane array would respond to light in exactly the same way. In reality, however, the microelectronic fabrication techniques that produce the semiconductor pixel structures have sufficient variability that the pixels do not respond to light in exactly the same way. When the focal plane array is calibrated, the threshold and electrical signal response as a function of intensity for the pixels are recorded and supplied to the processor as a calibration standard. This information, together with the electrical signal produced during service, permit a calculation of the actual incident light intensity as a function of the electrical signal output of each pixel.

To perform the calibration, it is important to illuminate the entire local plane array with a uniform intensity of light, so that the different responses of the nonuniform pixels may be evaluated and calibrated. Although a number of illumination sources are known and in use, over the wide angle required to illuminate a large focal plane array such illumination sources are uniform only to about 95-98 percent. A higher degree of uniformity is desired in order to achieve a better calibration of the pixels of the focal plane array.

Similar problems arise in calibrating and evaluating other types of optical devices, due to the unavailability of large-angle, uniform radiance (i.e., illumination) sources.

There is a need for such a highly uniform radiance source that is uniform over a large angle and thence a large illuminated area. The present invention fulfills this need, and further provides related advantages.

SUMMARY OF THE INVENTION

The present approach provides a radiance source that, in a preferred embodiment, has a 99.78 percent uniformity, according to ray trace analysis. The illumination is uniform over a wide angle, which can be established according to the specific system design. In a preferred embodiment, the illumination is uniform to the indicated uniformity over a 23-degree conical half-angle. This radiance source is useful in a wide range of applications, such as analysis and calibration of optical devices.

In accordance with the invention, a radiance source comprises a housing having an interior wall, wherein at least a spherical portion of the interior wall of the housing is spherical, an interior volume, and an exit port. A light source is disposed within the interior volume of the housing and supported from the interior wall of the housing. A calibration structure is disposed to block and reflect a light ray that would otherwise travel directly from the light source to the exit port without reflecting from the interior wall. The calibration structure comprises a calibration body having a curved back surface facing the light source and a curved front surface facing the exit port, and a support (preferably a spider support) positioning the calibration body relative to the exit port and to the light source. There is an optically diffuse reflecting surface on at least the spherical portion of the interior wall of the housing, the back surface of the calibration body, and the front surface of the calibration body. The optically diffuse reflecting surface desirably is a lambertian material, and most preferably is pressed, cast, and machined polytetrafluoroethylene.

In a first embodiment, the housing comprises a first chamber, a second chamber, and a transfer aperture extending between the first chamber and the second chamber. The first chamber preferably contains the light source and a first spherical segment of the spherical portion of the interior wall. The second chamber preferably contains the calibration structure and a second spherical segment of the spherical portion of the interior wall. The transfer aperture may have a fixed size or a variable size. The exit port and the transfer aperture desirably lie on an axis of symmetry of the interior wall.

In a preferred form of this first embodiment, a radiance source comprises a housing having an interior wall defining an interior volume, wherein at least a spherical portion of the interior wall of the housing is spherical. The housing comprises a first chamber comprising a first spherical segment of the spherical portion of the interior wall, a second chamber comprising a second spherical segment of the spherical portion of the interior wall, an exit port from the second chamber, and a transfer aperture extending between the first chamber and the second chamber. The exit port and the transfer aperture lie on an axis of symmetry of the interior wall. A plurality of light sources may be within the first chamber of the housing and supported from the interior wall of the housing. A calibration structure is within the second chamber and disposed to block and reflect a light ray that would otherwise travel directly from the light sources to the exit port without reflecting from the interior wall. The calibration structure comprises a calibration body having a curved back surface facing the transfer aperture and the light sources in the first chamber, and a curved front surface facing the exit port, and a spider support positioning the calibration body relative to the exit port and to the light source. An optically diffuse lambertian reflecting surface is on at least the spherical portion of the interior wall of the housing, the back surface of the calibration body, and the front surface of the calibration body. Other compatible features described herein may be used with this embodiment.

The transfer aperture preferably comprises an aperture plate having at least two aperture openings of different sizes therethrough. The aperture plate is movable, preferably by rotation, so that any of the aperture openings may be selectively aligned with the axis of symmetry. The transfer aperture also preferably comprises a portion of the interior wall shaped as a frustum of a cone with a smaller end of the frustum of the cone in communication with the first chamber, and a larger end of the frustum of the cone in communication with the second chamber. A cone half angle of the frustum of the cone is from about 12 degrees to about 18 degrees, most preferably about 15 degrees. The interior wall of the transfer aperture may instead be cylindrical.

In a second, less-favored embodiment of the radiance source, substantially the entire interior wall is spherical, and there is a single chamber and a calibration body. The exit port and the light source lie on a symmetry diameter of the spherical interior wall. The calibration body is symmetric about the symmetry diameter of the spherical interior wall. The front surface of the calibration body is curved, and is preferably spherically curved about the exit port.

The present approach provides a radiance source that has a uniformity over a wide angle significantly greater than available with any other known type of radiance sources. With the present radiance source, assessments and calibrations of optical devices may be performed to a greater precision than possible with other radiance sources.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
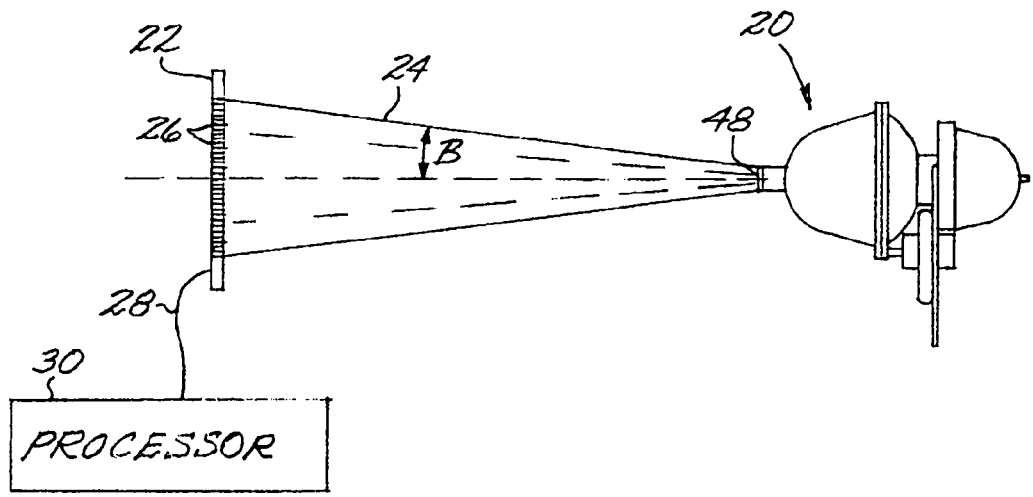
FIG. 1 is an elevational view of a radiance source used in the calibration of a focal plane array.

FIG. 1 depicts a radiance source 20 used in the calibration of a focal plane array (FPA) 22. The radiance source 20 is positioned to illuminate the FPA 22 with an illumination beam 24. The illumination beam 24 is highly uniform. An electrical output 28 of each of the individual pixels 26 of the FPA 22 is provided to a processor 30. The intensity of the illumination beam 24 is varied over a range of intensities, so that the electrical outputs 28 are obtained and stored in the processor 30 for each pixel 26 over a range of uniform illumination intensities. This information is used to generate a calibration of output as a function of illumination intensity for each pixel 26. The radiance source 20 has many other applications, and the application of FIG. 1 is described by way of example.

Figure 2:
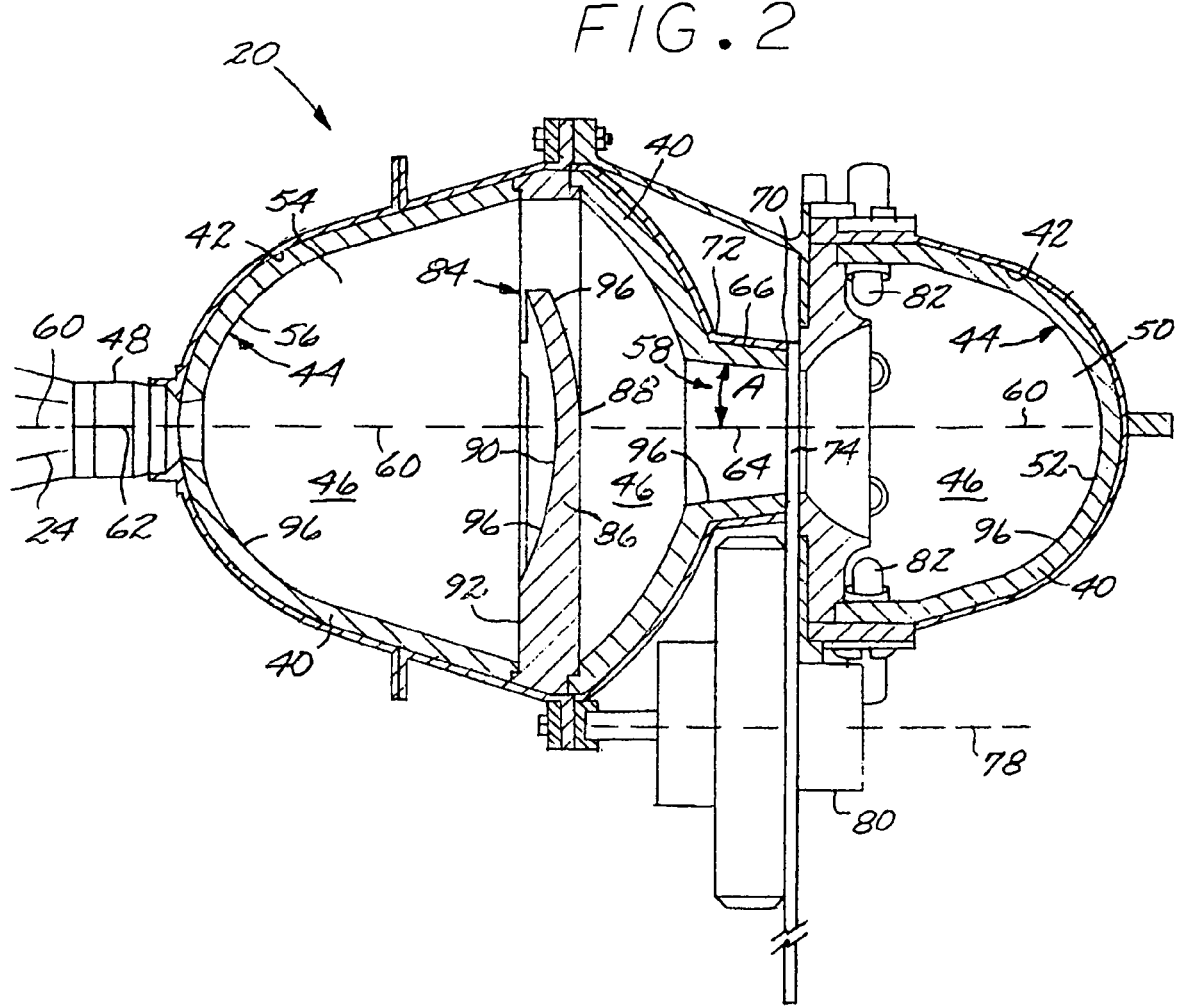
FIG. 2 is a side sectional view of a first embodiment of the radiance source.
Figure 3:
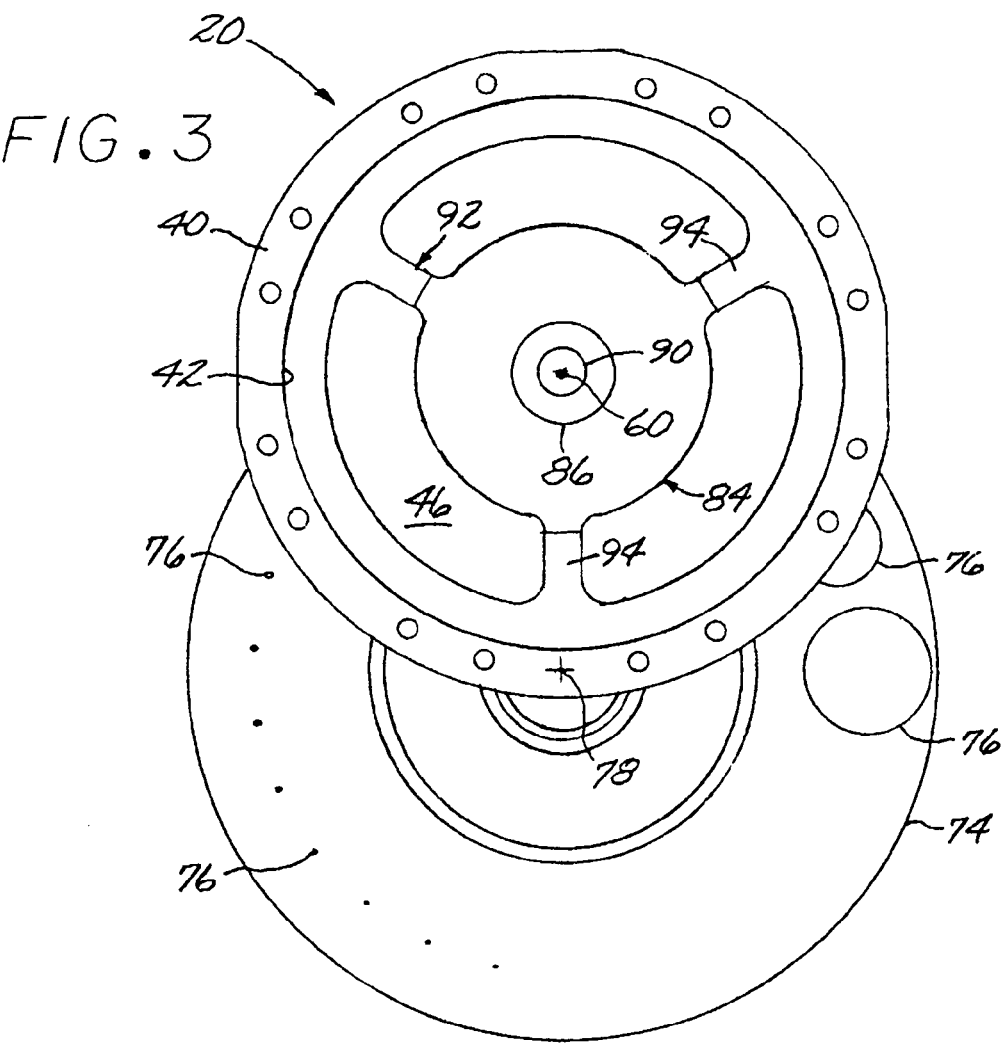
FIG. 3 is an end elevational view of the radiance source of FIG. 2, with a portion of the housing removed to reveal the internal structure.

FIGS. 2-3 depict a first, and preferred, embodiment of the radiance source 20. The radiance source 20 includes a housing 40 having an interior wall 42. At least a spherical portion 44 of the interior wall 42 of the housing 40 is spherical. That is, in this embodiment some, but not necessarily all, of the interior wall 42 is spherical. The interior wall 42 of the housing 40 defines an interior volume 46. There is an exit port 48, from which the illumination beam 24 projects, at one end of the housing 40.

The housing 40 of this first embodiment includes a first chamber 50 defined at least in part by a first spherical segment 52 of the spherical portion 44 of the interior wall 42, and a second chamber 54 defined at least in part by a second spherical segment 56 of the spherical portion 44 of the interior wall 42. The exit port 48 is from the second chamber 54 to the exterior of the housing 40.

A transfer aperture 58 extends between the first chamber 50 and the second chamber 54. In this preferred embodiment, a centerline 62 of the exit port 48 and a centerline 64 of the transfer aperture 58 lie on a rotational axis of symmetry 60 of the interior wall 42. Preferably, the transfer aperture 58 includes an aperture portion 66 of the interior wall 42 shaped as a frustum of a cone with a smaller end 70 of the frustum of the cone in light communication with the first chamber 50, and a larger end 72 of the frustum of the cone in light communication with the second chamber 54. Alternatively, the aperture portion 66 of the interior wall 66 of the transfer aperture 58 may be cylindrical.

In a preferred design where a lambertian reflecting material is used as the material of construction of the aperture portion 66 of the interior wall 42 of the transfer aperture 58, a cone half angle A of the frustum of the cone is from about 12 degrees to about 18 degrees, most preferably about 15 degrees. This shape and angle of the aperture portion 66 has been found to optimize the uniformity and throughput of light from the first chamber 50 to the second chamber 54, and thence out the exit port 48. In another design where a specular material is used as the material of construction of the aperture portion 66 of the interior wall 42 of the transfer aperture 58 instead of the lambertian material, the aperture portion 66 of the interior wall 42 of the transfer aperture 58 is cylindrical in shape (which may be considered as a limiting case of a frustum of a cone with the cone half angle of zero). This design results in an increased light throughput through the transfer aperture 58 and out the exit port 48, but with a slightly reduced uniformity of light in the illumination beam 24.

The transfer aperture 58 may be of a fixed size so that a fixed amount of light reaches the second chamber 54 from the first chamber 50. The transfer aperture 58 may instead be, and preferably is, variable in size so that a selectable amount of light reaches the second chamber 54 from the first chamber 50. In the illustrated approach to the variable-size transfer aperture 58, the transfer aperture includes an aperture plate 74 having at least two (and preferably a plurality of) aperture openings 76 (FIG. 3) of different sizes therethrough. In the preferred design, each aperture opening 76 is larger than the next-smaller aperture opening 76 by a factor of the square root of 2 (approximately 1.414). The aperture plate 74 is movable so that any of the aperture openings 76 may be selectively aligned with the axis of symmetry 60 in the transfer aperture 58, so allow different amounts of light to pass from the first chamber 50 to the second chamber 54. In this case, the aperture plate 74 is rotatable about an axis of rotation 78, driven by a motor 80, such as a stepper motor.

A light source 82 is disposed within the interior volume 46 of the housing 40 and is supported from the interior wall 42 of the housing 40. In the embodiment of FIGS. 2-3, there are a plurality of light sources 82 within the first chamber 50 of the housing 40. In the preferred embodiment, the light sources 82 are eight miniature quartz tungsten halogen lamps positioned symmetrically around the axis of symmetry 60 and at a location within the housing 40 so that their output rays can not propagate through the transfer aperture 58 without reflecting from the interior wall 42 of the first chamber 50 at least once.

A calibration structure 84 is disposed within the interior volume 46 of the housing 40, and specifically within the second chamber 54, to block and reflect a light ray that would otherwise travel directly from the light sources 82 to the exit port 48 without reflecting from the interior wall 42 at least once. In the preferred design, the calibration structure 84 blocks light rays that would otherwise travel directly from the transfer aperture 58 to the exit port 48 without reflecting from the interior wall 42 at least once. The calibration structure 84 includes a calibration body 86 having a curved back surface 88, which acts as a baffle, facing the transfer aperture 58 and thence toward the light sources 82 in the first chamber 50, and a curved front surface 90, which acts as the calibration target, facing the exit port 48. The curved back surface 88 and the curved front surface 90 are preferably spherical surfaces, centered about the intersection of the axis of symmetry 60 with the exit port 48. However, the exact curvature of the curved back surface 88 has little ultimate effect on the performance of the radiance source 20. The curved back surface 88 has a larger radius of curvature than the curved front surface 90, preferably about 0.2 inches, which difference defines the minimum thickness of the calibration body 86. This 0.2-inch thickness is the preferred minimum thickness for the preferred Spectralon® material of construction, to be discussed subsequently. The calibration structure 84 further includes a support, preferably a spider support 92, positioning the calibration body 86 relative to the exit port 48, the interior wall 42, and the light sources 82. In the illustrated embodiment, the spider support 92 has three symmetrically spaced (FIG. 3) legs 94. Each leg 94 extends from the calibration body 86 to the interior wall 42 of the housing 40.

There is an optically diffuse reflecting surface material 96 on at least the spherical portion 44 (including but not limited to the first spherical segment 52 and the second spherical segment 56) of the interior wall 42 of the housing 40, the back surface 88 of the calibration body 86, and the front surface 90 of the calibration body 86. The calibration body 86 is preferably machined from the reflecting surface material 96, while the walls are covered with a layer of the reflecting surface material 96. The thickness of the layer of the preferred reflecting surface material 96 is preferably about 0.2 inches or more, but most preferably 0.2 inches as this is the minimum thickness for full effectiveness of the preferred reflecting surface material 96. The thickness of the layer of the reflecting surface material 96 is exaggerated in the drawings so that it may be clearly seen.

The optically diffuse reflecting surface 96 is a substantially lambertian material. A lambertian material is a material whose surface reflections obey Lambert's cosine law. In the preferred embodiment, the optically diffuse reflecting surface 96 is made of Spectralon® material. Spectralon® material is pressed polytetrafluoroethylene, cast into blocks, then machined to shape. Spectralon® material has the highest diffuse reflectance of any known material over the ultraviolet-visible-infrared wavelength region. Spectralon® material is available from Labsphere Co., North Sutton, N.H., and other companies make similar material.

The radiance source 20 of FIGS. 2-3 functions in the following manner. Light rays are produced by the light sources 82. The light rays reflect at least once, and preferably multiple times, from the first spherical segment 52 of the first chamber 50, eventually passing through the transfer aperture 58 to the second chamber 54. The light rays reflect from the back surface 88 of the calibration body 86 against the interior wall 42 of the second chamber 54, and eventually off the second spherical segment 56 of the second chamber 54. The light rays reflect in the interior of the second chamber 54 and from the front surface 90 of the calibration body 86, preferably multiple times from the different surfaces. Eventually, the light rays pass through the exit port 48 to become the illumination beam 24 of FIG. 1.

The combination of the many reflections, the structural symmetry of the interior wall 42, and the use of the lambertian material on the inner walls results in a highly uniform illumination beam 24. A computer trace analysis of $500 \times 10^6$ random rays starting from the light sources 82 showed that the illumination beam 24 was uniform to better than 3 decimal places, and in particular to about 99.78 percent uniformity, across an illumination-beam conical half angle B of 23 degrees in the preferred design.

Figure 4:
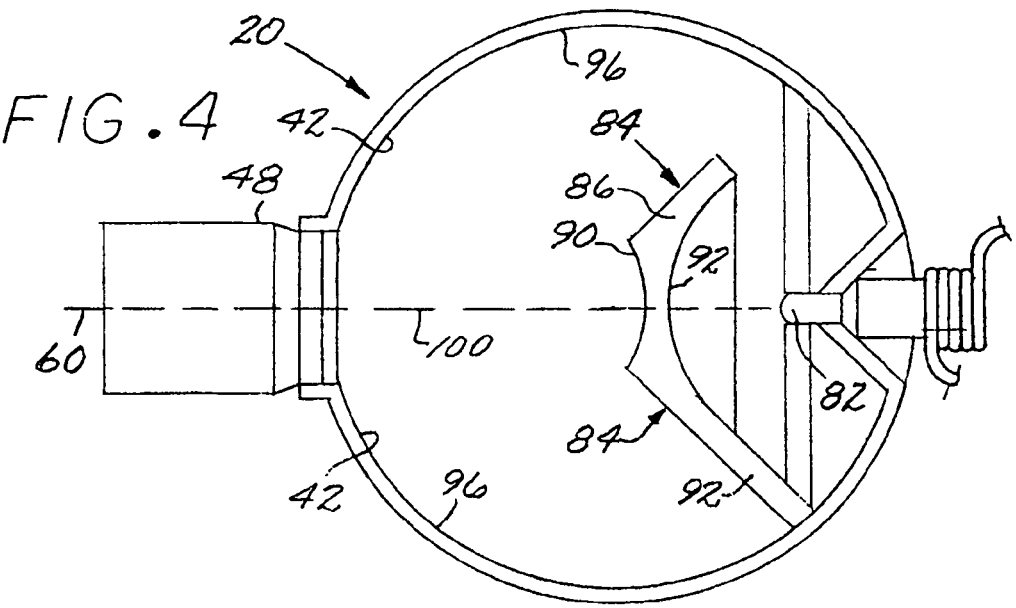
FIG. 4 is a schematic side sectional view of a second embodiment of the radiance source.

FIG. 4 depicts a second, and less favored, embodiment of the radiance source 20. The prior description is incorporated here to the extent applicable, and like elements are assigned the same reference numerals. In the embodiment of FIG. 4, there is a single chamber, and substantially the entire interior wall 42 is spherical except for attachment points. Substantially the entire interior wall 42, except for attachment points, has the optically diffuse reflecting surface 96. The exit port 48 and the light source 82 lie on a symmetry diameter 100 of the spherical interior wall 42. The calibration body 86 is symmetric about the symmetry diameter 100 of the spherical interior wall 42.

The radiance source 20 of FIG. 4 has a uniformity of the illumination beam 24 of about 99.5 percent, less than that of the embodiment of FIGS. 2-3 but still much better than that of other available radiance sources. It is expected that, because of its simpler construction, the embodiment of FIG. 4 is more likely to be built for common laboratory applications that do not require the very highest degree of uniformity found in the embodiment of FIGS. 2-3.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A radiance source comprising:
    a housing having an interior wall, wherein at least a spherical portion of the interior wall of the housing is spherical, an interior volume, and an exit port;
    a light source disposed within the interior volume of the housing and supported from the interior wall of the housing;
    a calibration structure disposed to block and reflect a light ray that would otherwise travel directly from the light source to the exit port without reflecting from the interior wall, wherein the calibration structure comprises a calibration body having a curved back surface facing the light source and a curved front surface facing the exit port, wherein a radius of curvature of the curved back surface is larger than a radius of curvature of the curved front surface,
    a support positioning the calibration body relative to the exit port and to the light source;
    an optically diffuse reflecting surface on at least the spherical portion of the interior wall of the housing, the back surface of the calibration body, and the front surface of the calibration body;
    wherein the housing comprises a first chamber containing the light source, a second chamber containing the calibration structure, and a transfer aperture extending between the first chamber and the second chamber.

2. The radiance source of claim 1, wherein the optically diffuse reflecting surface comprises a lambertian material.

3. The radiance source of claim 1, wherein the optically diffuse reflecting surface comprises pressed, cast, and machined polytetrafluoroethylene.

4. The radiance source of claim 1, wherein the housing comprises a first chamber, a second chamber, and a transfer aperture extending between the first chamber and the second chamber.

5. The radiance source of claim 1, wherein the housing comprises a first chamber containing the light source and a first spherical segment of the spherical portion of the interior wall, a second chamber containing the calibration structure and a second spherical segment of the spherical portion of the interior wall, and a transfer aperture extending between the first chamber and the second chamber, wherein the exit port and the transfer aperture lie on an axis of symmetry of the interior wall.

6. The radiance source of claim 1, wherein substantially the entire interior wall is spherical.

7. The radiance source of claim 1, wherein substantially all of the interior wall is spherical, and wherein the exit port and the light source lie on a symmetry diameter of the spherical interior wall.

8. The radiance source of claim 1, wherein substantially all of the interior wall is spherical, wherein the exit port and the light source lie on a symmetry diameter of the spherical interior wall, and wherein the calibration body is symmetric about the symmetry diameter of the spherical interior wall.

9. The radiance source of claim 1, wherein the housing comprises a single chamber.

10. A radiance source comprising:
  a housing having an interior wall defining an interior volume, wherein at least a spherical portion of the interior wall of the housing is spherical, the housing comprising:
    a first chamber comprising a first spherical segment of the spherical portion of the interior wall,
    a second chamber comprising a second spherical segment of the spherical portion of the interior wall,
    an exit port from the second chamber, and
    a transfer aperture extending between the first chamber and the second chamber,
    wherein the exit port and the transfer aperture lie on an axis of symmetry of the interior wall;
  a plurality of light sources within the first chamber of the housing and supported from the interior wall of the housing; and
  a calibration structure within the second chamber and disposed to block and reflect a light ray that would otherwise travel directly from the light sources to the exit port without reflecting from the interior wall, wherein the calibration structure comprises a calibration body having a curved back surface facing the transfer aperture and the light sources in the first chamber, and a curved front surface facing the exit port, wherein a radius of curvature of the curved back surface is larger than a radius of curvature of the curved front surface, and a spider support positioning the calibration body relative to the exit port and to the light source; and
  an optically diffuse lambertian reflecting surface on at least the spherical portion of the interior wall of the housing, the back surface of the calibration body, and the front surface of the calibration body.

11. The radiance source of claim 10, wherein the optically diffuse reflecting surface comprises pressed, cast, and machined polytetrafluoroethylene.

12. The radiance source of claim 10, wherein the transfer aperture is a variable aperture.

13. The radiance source of claim 10, wherein the transfer aperture comprises an aperture plate having at least two aperture openings of different sizes therethrough, and wherein the aperture plate is movable so that any of the aperture openings may be selectively aligned with the axis of symmetry.

14. The radiance source of claim 10, wherein the transfer aperture comprises an aperture plate having at least two aperture openings of different sizes therethrough, and wherein the aperture plate is rotatable so that any of the aperture openings may be selectively aligned with the axis of symmetry.

15. The radiance source of claim 10, wherein the transfer aperture comprises a portion of the interior wall shaped as a frustum of a cone with a smaller end of the frustum of the cone in communication with the first chamber, and a larger end of the frustum of the cone in communication with the second chamber.

16. The radiance source of claim 10, wherein the transfer aperture comprises a portion of the interior wall shaped as a frustum of a cone with a smaller end of the frustum of the cone in communication with the first chamber, and a larger end of the frustum of the cone in communication with the second chamber, and wherein a cone half angle of the frustum of the cone is from about 12 degrees to about 18 degrees.

17. The radiance source of claim 10, wherein the transfer aperture comprises a portion of the interior wall shaped as a cylinder.

* * * * *